(12) United States Patent
Killen et al.

(10) Patent No.: US 8,508,928 B2
(45) Date of Patent: Aug. 13, 2013

(54) INCORPORATION OF MULTIPLE, 2.5-INCH OR SMALLER HARD DISK DRIVES INTO A SINGLE DRIVE CARRIER WITH A SINGLE MIDPLANE OR BASEBOARD CONNECTOR

(75) Inventors: Odie B. Killen, Colorado Springs, CO (US); Paul K. Foisy, Dunedin, FL (US); Robert I. Walker, Clearwater Beach, FL (US)

(73) Assignee: Jabil Circuit, Inc., St. Petersburg, FL (US)

( * ) Notice: Subject to any disclaimer, the term of this patent is extended or adjusted under 35 U.S.C. 154(b) by 709 days.

(21) Appl. No.: 12/565,850

(22) Filed: Sep. 24, 2009

(65) Prior Publication Data

US 2011/0069441 A1     Mar. 24, 2011

(51) Int. Cl.
*H05K 5/00* (2006.01)
*H05K 7/00* (2006.01)
*G06F 1/16* (2006.01)

(52) U.S. Cl.
USPC ............ 361/679.33; 361/679.37; 361/679.38; 361/679.39

(58) Field of Classification Search
USPC .............. 361/679.33, 679.37, 679.38, 679.39
See application file for complete search history.

(56) References Cited

U.S. PATENT DOCUMENTS

| | | |
|---|---|---|
| D358,141 S | 5/1995 | Pecone et al. |
| 5,588,728 A | 12/1996 | Eldridge et al. |
| 6,381,130 B1 | 4/2002 | Yen |
| 6,876,547 B2 | 4/2005 | McAlister |
| 7,414,835 B2 * | 8/2008 | Katakura et al. ......... 361/679.33 |
| 2002/0085358 A1 | 7/2002 | Homer et al. |
| 2004/0037034 A1 | 2/2004 | Suzuki et al. |
| 2006/0126210 A1 * | 6/2006 | Katakura et al. ................ 360/69 |

OTHER PUBLICATIONS

Non-Final Office Action on U.S. Appl. No. 12/246,170, mailed May 4, 2010.
Notice of Allowance on U.S. Appl. No. 12/246,170, mailed Feb. 24, 2011.

* cited by examiner

*Primary Examiner* — Anthony Haughton
(74) *Attorney, Agent, or Firm* — Foley & Lardner LLP (57) ABSTRACT

Carrier for the rack mounting of two or more data storage devices into a chassis. The carrier includes support members along the length of the carrier, to receive and retain the two or more data storage devices. The carrier further includes a single electrical communication connector to provide an electrical communication interface for all of the data storage devices in the carrier, to and from a mating connector on a board of the chassis. The carrier further includes an interposer to adapt electrical signals from the single electrical communication connector into a form that is usable by the data storage devices.

22 Claims, 8 Drawing Sheets

INCORPORATION OF MULTIPLE, 2.5-INCH OR SMALLER HARD DISK DRIVES INTO A SINGLE DRIVE CARRIER WITH A SINGLE MIDPLANE OR BASEBOARD CONNECTOR

BACKGROUND OF THE INVENTION

1. Statement of the Technical Field

The present invention relates to storage device carriers and chassis assemblies. More particularly, the present invention relates to storage device carriers comprising a support member (e.g., a tray, a sled, a frame, or a pair of rails) in which more than one storage device (e.g., a Hard Disk Drive or a Solid State Disk drive) can be inserted therein and removed therefrom as a single unit.

2. Description of the Related Art

Conventional computer systems and information networks require external data storage for storing large volumes of data. The external data storage typically includes Hard Disk Drives (HDDs) having a rotatable storage medium, or Solid State Disk (SSD) drives having no rotatable storage medium. The HDD/SSD family sizes known in the related art include at least 3.5", 2.5", 1.8", 1.3" and 1.0" diameter drives.

Various mechanisms have been developed for housing the HDDs or SSD drives. One such mechanism is referred to as a hard disk drive (HDD) carrier and chassis assembly. The HDD carrier and chassis assembly accommodates the HDD and mates with the chassis assembly. During operation, an HDD is typically disposed in the HDD carrier. The HDD carrier is then inserted into a drive cage (or drive bay) in a computer chassis. An electromagnetic interface (EMI) shield is often included as part of the HDD carrier. The EMI shield functions to prevent any EMI interference from radiating outside of the computer or disk enclosure. The EMI shield also functions to reduce the susceptibility of the HDD/SDD to EMI interference originating from other components external to the EMI shield.

Often the computer chassis (enclosure or shelf) is installed into a EIA standard 'rack' of predetermined standard dimensions. The enclosure may have at least one linear dimension that is a multiple of a standard dimension. The standard dimension is referred to as a rack unit ("U" or "RU"), and multiples of this dimension are referred to as 2U, 3U, etc. The rack may be configured as a plurality of horizontal enclosures arranged in a vertical stack, where the rack unit is in a vertical direction. Alternatively, the rack may be configured as a plurality of enclosures (e.g., shelves), such that the rack unit is in a horizontal direction. Within each enclosure there are a number of disk drives. Each disk drive may be located horizontally or vertically into the shelf. Each disk drive will be inserted into a 'Sled' or 'Disk Carrier'. Each Disk Carrier may have a PCB 'paddle card' acting as an interposer between the disk drive and a system circuit board. The system circuit board may be arranged in a plane substantially orthogonal to the plane of the plurality of Disk Carriers, wherein the system circuit board provides electrical interconnections within the plurality of disk carriers, and from the plurality of circuit boards to other portions of the computer system or vice versa. A midplane board may be used to separate the system circuit board and the plurality of disk carriers from a portion of the enclosure. Usage of a system circuit board allows additional circuitry to be located in an area behind the midplane board. The additional circuitry typically includes cooling fans and a controller. If no additional circuitry is located behind the midplane, then the midplane may be equivalent to a backplane. Without limiting the embodiments described herein, the additional circuitry may be of a wide variety of designs that are either compatible or non-compatible with industry standards for rack enclosures, such as the Storage Bridge Bay ("SBB") specifications, which are known to persons of ordinary skill in the art.

Various HDD carrier (e.g., sled) and chassis assemblies have been developed that include more than one drive per carrier in a horizontal or vertical orientation, however these carriers are unable to support hot-swapping of two or more drives simultaneously. Some other HDD carrier and chassis assemblies have implemented higher drive densities, however these assemblies include only a single drive, and do not include a hot-swappable power capability. No other HDD carrier permits tool-less insertion or removal of the disk from the carrier.

Despite the advantages of the HDD carrier and chassis assembly, it suffers from certain drawbacks. For example, storage density in a chassis may be unable to fully take advantage of new, physically smaller drive sizes because the number of drives—and ultimately the storage capacity—in the chassis is limited by the size of the sled holding the drive. The size and quantity of connectors needed to interface the drives to the chassis for electrical communication has an undesirable impact upon the volumes of space able to be devoted to other functions within the chassis. The lack of a hot-swap capability results in more cumbersome maintenance procedures when a drive has to be replaced.

SUMMARY OF THE INVENTION

Embodiments of the present invention relate to a carrier for data storage devices. The carrier accommodates multiple (at least two) data storage devices mounted in a common drive carrier, in order to achieve a drive density of up to twenty-four 2.5-inch HDD drives per rack unit, or up to 96 such drives in a fully populated 4U enclosure. The common drive carrier may also be referred herein as a multi-drive carrier. The data storage devices may be mounted in the multi-drive carrier by use of mechanisms including, but not limited to: a screw; rivet; captivating rail feature; and/or a tool-less carrier design. A tool-less design for this mechanism is a design which does not require the use of a tool (e.g., a screwdriver) to engage or disengage the data storage device(s) to the multi-drive carrier. The tool-less carrier design is further described in copending U.S. patent application Ser. No. 12/246,170 by Walker et al., filed Oct. 6, 2008, the entire content of which is hereby incorporated by reference in its entirety.

The multi-drive carrier is further designed to be mounted into a chassis such as a computer rack. The chassis may also be referred to as a cage or drive cage. The chassis may include a plurality of multi-drive carriers enclosed by the chassis. The data storage devices are stackably mounted on the carrier such that a major face of one data storage device is adjacent to a major face of the second data storage device, thereby substantially preserving the footprint dimensions of the multi-drive carrier—as viewed from the direction normal to a plane including a major face of one of the data storage devices—compared to a single drive carrier. The drives are oriented vertically and stacked horizontally. Usage of the multi-drive carrier provides enhanced storage density in the chassis, without substantially affecting the cross-sectional dimensions of the chassis space used. The multi-drive carrier may be thicker compared to a single drive carrier, in the direction normal to a plane including a major face of one of the data storage devices.

The multi-drive carrier employs a single electrical communication connector, e.g., a SCA2-40 or SCA2-80 connector, to provide a hot-swappable, field-replaceable electrical communication interconnect between the multi-drive carrier and the chassis enclosure via a mating connector on a midplane circuit board. The SCA2-40 is a 40-pin Single Connector Attachment ("SCA") connector for the cabling of Small Computer System Interface ("SCSI") systems. The SCA2-80 is an 80-pin SCA connector similar to SCA2-40, but providing additional functions. The SCA interface may carry both data and power and also allows drive(s) to receive their configuration parameters from the system baseboard. Some of the pins in the SCA2-40 or SCA2-80 connector may be longer than other pins, in order to facilitate hot swapping capability. The differing pin lengths provide a preferred sequence of connection and disconnection among the pins as the connector is mated and unmated with a matching connector on the system baseboard. The additional length may also provide a pre-charge to alert the device to a pending power surge, allowing for a slower transition to full power, thereby making the device more stable and further facilitating hot swapping capability. Individual drives within the multi-drive carrier are hot-swappable without disturbing operation of other drives mounted in the multi-drive carrier. The entire multi-drive carrier also is hot-swappable, without disturbing operation of other drives mounted elsewhere in the chassis.

The multi-drive carrier includes a plurality of support member that are sized and shaped to receive and retain a data storage device. The multi-drive carrier may also include a structure to retain the data storage devices in the respective support member, e.g., one or more projecting members configured to secure a drive to the multi-drive carrier. Such a projecting member, if present, may extend from a portion of the multi-drive carrier towards the data storage devices. The projecting member is retained in position by a structure selected from the group consisting of a rail and a sidewall of the support member. The projecting member can include a pin (or post) or screw. The support member and associated structure to retain the data storage devices in the support member are further described in copending U.S. patent application Ser. No. 12/246,170, the entire content of which are hereby incorporated by reference.

According to an embodiment of the present invention, the support member has a major linear dimension in a vertical direction and includes sidewalls coupled to a planar base member. One or more of the sidewalls has at least one aperture formed therethrough sized and shaped to receive the projecting member. The projecting member is disposed on a first face of a planar plate (or pin rail) so as to project outwardly therefrom. The planar plate (or pin rail) can be secured to the support member by the rail. A light pipe is also provided that can be secured to the support member by the rail. The rail comprises a capturing structure for capturing a peripheral edge portion of a multi-drive carrier termination. An EMI shielding gasket can further be provided that is captured between two or more rails and a bezel.

According to another embodiment of the present invention, the support member has a shape defined by a plurality of sidewalls. The projecting member is disposed on one of the sidewalls and extends outwardly therefrom. At least one of the sidewalls may be formed of a flexible material and/or is removably coupled to the support member. If the sidewall is removably coupled to the support member, then the sidewall can comprise a coupling structure selected from the group consisting of a hook and a hinge. At least one of the sidewalls also includes a capturing structure for capturing a peripheral edge portion of a paddle card for mounting in the carrier. At least one of the sidewalls can also have a light pipe embedded therein.

According to an embodiment of the present invention, a carrier for a plurality of data storage devices includes: a first support member sized and shaped to receive vertically and retain a data storage device; a second support member sized and shaped to receive and retain a plurality of first support members, the second support member fittable in a chassis; and an electrical communication interface from the chassis to the data storage devices within the plurality of first support members, the electrical communication interface comprising a single connector that mates with a matching connector on the chassis.

According to a further embodiment of the present invention, the carrier is further characterized by a cuboid bounding shape for the first support member, the cuboid bounding shape comprising a first major surface, a second major surface opposite the first major surface, and four edge surfaces substantially perpendicular to the first and second major surfaces, the four edge surfaces connecting the first and second major surfaces, the four edge surfaces together forming a substantially rectangular shape. Further, the second support member receives and retains the plurality of first support members such that a major surface of at least one cuboid bounding shape is adjacent to a major surface of another cuboid bounding shape.

An embodiment of the present invention further includes a method for providing high capacity data storage in an assembly, the method including: inserting a data storage device into an insert space of a first support member defined by a first plurality of sidewalls; removably securing the data storage device within the support member; inserting a plurality of first support members into an insert space of a second support member defined by a second plurality of sidewalls; removably securing the plurality of first support members within the second support member, such that each data storage device within the plurality of first support members is in electrical communication contact with a one connector on the second support member; and removably securing the second support member within the assembly, such that the one connector on the second support member is in electrical communication contact with the chassis.

BRIEF DESCRIPTION OF THE DRAWINGS

Features illustrated in the figures are not drawn to scale unless explicitly stated otherwise, and the relative sizes of certain features may be exaggerated to better illustrate the features. Embodiments will be described with reference to the following figures, in which like numerals represent like items throughout the figures, and in which.

DETAILED DESCRIPTION OF THE PREFERRED EMBODIMENTS

There is a need for higher density data storage for a computer and storage assembly. Embodiments of the present invention relate to a carrier for multiple data storage devices, in order to provide high density storage. The higher density storage should be fittable within existing enclosures in one or more rack units of size. The higher data storage should provide at least 24 drives per rack unit ("U"), and should be top loadable and hot swappable in a chassis. The design should facilitate field-replacement with a minimum of operation disruption.

Accordingly, in an embodiment of the present invention, there may be included a multi-drive carrier stackably fittable within a 4U enclosure and providing a total of up to 96 drives. For instance, in the 4U enclosure, the drives may be stacked two per drive carrier in a configuration that houses twelve drive carriers per stack, each drive positioned vertically and the stack of drives extending horizontally, wherein the vertical dimension of the drive carrier is 4U. Twelve drive carriers are stacked to form a row having a total of 24 drives, the row being 4U in height. Four rows are included in the shelf, one row behind another row, for a total of up to 96 drives housed in the shelf when fully populated, the shelf being 4U in height.

The multi-drive carrier may use a single electrical communication connector, e.g., a SCA2-40 or SCA2-80 connector, to provide the electrical interconnect between the multi-drive carrier and the chassis enclosure via a mating connector on a circuit board. The usage of a single electrical communication connector to service both drives on the multi-drive carrier allows for a reduced connector count, and associated benefits such as reduced wiring within the enclosure, compactness, and improved maintainability. For vertically-mounted drives and drive carriers, the connecting circuit board is a baseboard circuit board that provides electrical connections to the drive carriers along the bottom of the shelf.

In another embodiment of the invention, the drive carriers can be installed into the enclosure such that a horizontal attachment is made with a midplane board. Multiple midplane boards may be provided in order to accommodate multiple rows of HDDs. The horizontal attachment may be achieved by installing the HDDs horizontally, or by providing an interposer board that includes a right-angle interface from a horizontal attachment with a midplane board to a vertical connector on the HDDs.

The connector may be designed to provide a hot-swap capability, for instance some of the pins in the SCA2-40 or SCA2-80 connector may be longer than other pins, in order to provide a preferred sequence of connection and disconnection among the pins as the connector is mated and unmated with a matching connector on the connecting circuit board. One non-limiting example is that the ground pin may be designed to be longer than the DC power pin. A ground pin longer than the power pin will facilitate establishing a ground connection before establishing a DC power connection when inserting the multi-drive carrier into a chassis, and will also facilitate a disconnection of the DC power connection before the ground connection when removing the multi-drive carrier from the chassis. The additional length on certain pins may also provide a pre-charge to alert the device to a pending power surge, allowing for a slower transition to full power, thereby making the device more stable and facilitating hot swapping capability. The hot-swap capability may be supported by electronic hot swap components located on the paddle cards.

A rear portion of the shelf, behind the area used to house the drives, may be located circuitry that provides supporting functions for the hard drives. Such circuitry is known as an expander module. Examples of such functions include cooling (e.g., fans); UART port(s) for debugging; UARTs for Storage Enclosure Processors ("SEP") to SEP communications; networking support such as Ethernet ports for out-of-band management; and monitoring, control, and reset functions. The expander module may be designed to be SBB compliant, however, non-SBB compliant designs are supported as well.

Embodiments of the present invention provide a more compact data storage solution than the related art. Therefore, more volume within a rack or chassis is available for other uses, such as to allow for hot-swappable, redundant, power and cooling to be implemented in a high density enclosure.

Embodiments of the present invention will now be described with respect to the Figures. Embodiments of the present invention relate to a multi-drive carrier assembly for storage devices (e.g., a Hard Disk Drive or Solid State Disk drive) that can be removably housed in a chassis (e.g., a drive cage or drive bay in a computer chassis). More particularly, embodiments of the present invention concern multi-drive carrier assemblies comprising support structures (e.g., a tray, a sled, a frame, or a set of rails) in which storage devices can be inserted and retained therein, and the multi-drive carrier is hot swappable and field-replaceable. In some embodiments, the multi-drive carrier may facilitate the replacement of individual drives, with or without the use of tools (e.g., a screwdriver), once the multi-drive carrier has been removed from the chassis. Individual drives within the multi-drive carrier are hot-swappable without disturbing operation of other drives mounted in the multi-drive carrier. The entire multi-drive carrier also is hot-swappable, without disturbing operation of other drives mounted elsewhere in the chassis.

As such, embodiments of the present invention overcome certain drawbacks of conventional storage device carrier and chassis assemblies. More particularly, multi-drive carrier embodiments of the present invention facilitate improved storage densities with an improved method for inserting storage devices into, retaining storage devices in, and removing storage devices from storage device carriers. The improved method is less time consuming and cumbersome than the conventional methods of assembling and/or dissembling storage device carrier assemblies, and the improved multi-drive carrier provides more data storage in a compact volume, with fewer interconnections, and a hot-swapping capability.

Before describing the multi-drive carrier assemblies of the present invention, it will be helpful in understanding an exemplary environment in which the invention can be utilized. In this regard, it should be understood that the multi-drive carrier assemblies of the present invention can be utilized in a variety of different applications where external data storage (e.g., a Hard Disk Drive, a Compact Disc Drive, a Solid State Disk drive, and/or a Digital Versatile Disk drive) is needed for storing large volumes of data. Such applications include, but are not limited to, computer system applications, server applications, storage appliance applications, Just A Bunch Of Disks (JBOD) storage applications, and information network applications. Accordingly, embodiments of the present invention will be described in relation to a computer system computer application where hard disk drives (HDDs) are used for storing data.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Figure 1:
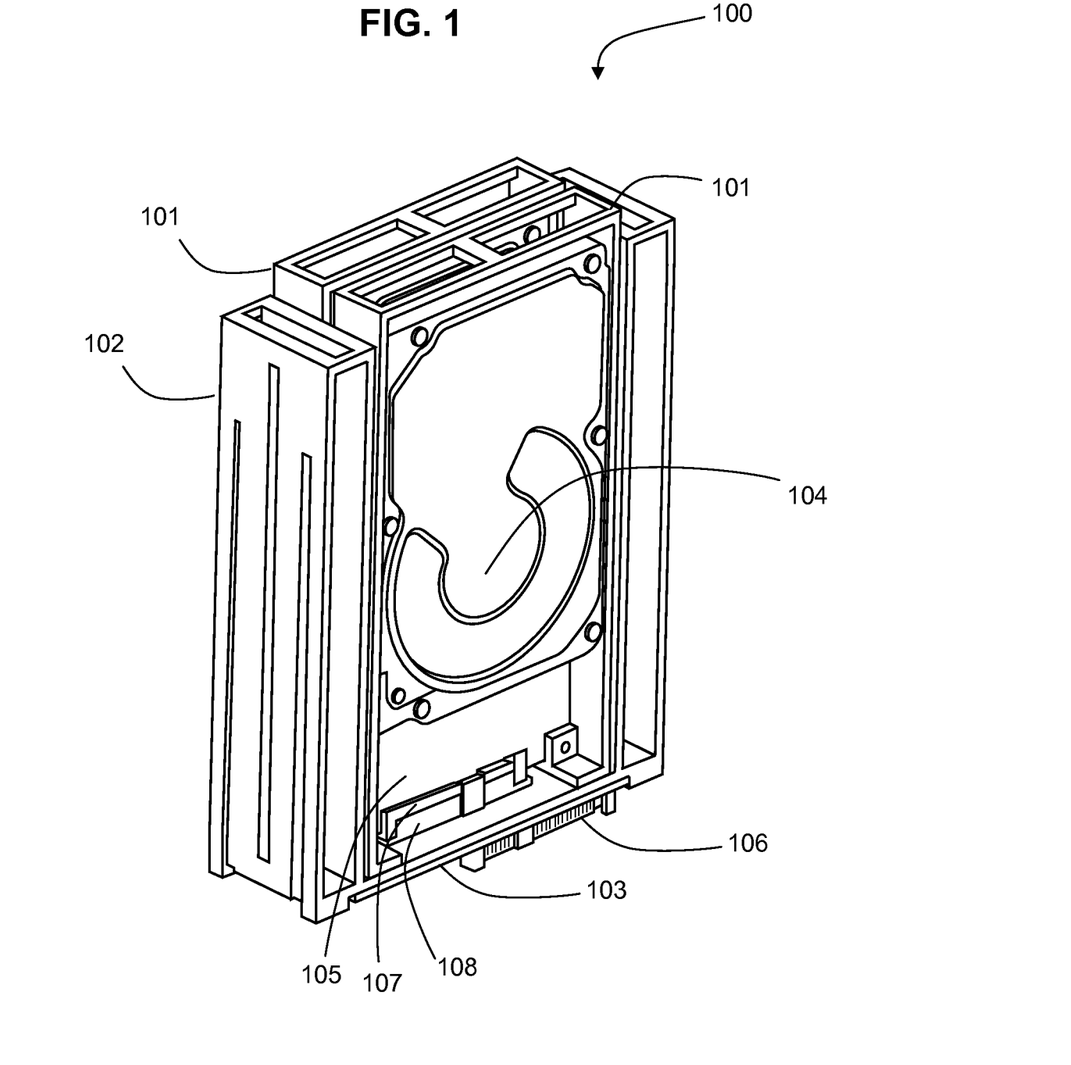
FIG. 1 is a front perspective view of an exemplary multi-drive carrier assembly that is useful for understanding the present invention.

Referring now to FIG. 1, there is provided a front perspective view of an exemplary multi-drive carrier assembly 100 according to an embodiment of the present invention. The multi-drive carrier assembly 100 can be housed in a chassis (e.g., a drive cage). Chassis are well known to those having ordinary skill in the art, and therefore will not be described herein. However, it should be understood that the multi-drive carrier assembly 100 can be housed in any chassis selected in accordance with a particular HDD application.

The multi-drive carrier assembly 100 comprises a plurality of sets of drive carrier rails 101, one set per HDD 104. The plurality of sets of drive carrier rails 101 are affixed to a main carrier assembly 102. The main carrier assembly 102 is affixed to a printed circuit board (PCB) 103. PCB 103 may include interposer functions as described below in further detail. The plurality of HDDs are in electrical communication with the PCB 103 via a paddle card 105 and paddle card connector 107 for each HDD 104. Paddle card connector 107 mates with connector 108 on PCB 103. The PCB 103 is in electrical communication with a system baseboard (not shown in FIG. 1) via a connector 106.

The multi-drive carrier assembly 100 is generally configured for removably retaining the plurality of HDD 104. The multi-drive carrier assembly 100 is advantageously configured to facilitate the insertion and retention of one or more of the plurality of sets of drive carrier rails 101 therein with or without the use of tools (e.g., screwdrivers). The sets of drive carrier rails 101 are also advantageously configured to facilitate the removal of one or more HDD 104 therefrom with or without the use of tools (e.g., screwdrivers).

Figure 2:
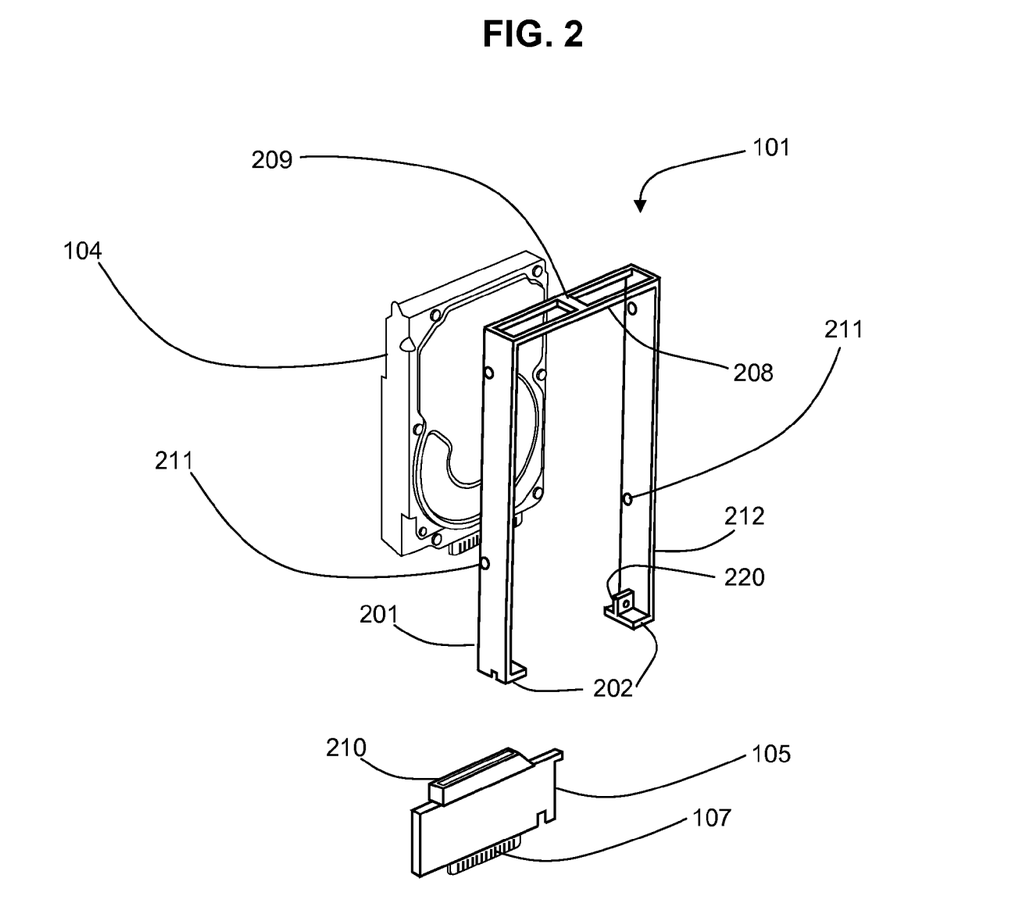
FIG. 2 is an exploded view of a portion of the exemplary multi-drive carrier assembly that is useful for understanding the present invention, showing a holder of one HDD, and the physical and electrical interface to the HDD.

FIG. 2 illustrates an exploded view of a portion of multi-drive carrier assembly 100. A set of drive carrier rails 101 comprises two sidewall vertical support members 201, 212 that run lengthwise along the multi-drive carrier 100 to support and secure HDD 104, and includes one or more cross-members 208 to provide structural integrity. As shown in FIG. 2, the shape of the set of drive carrier rails 101 is generally bounded by a cuboid bounding shape that has a substantially rectangular cross-section, with the cuboid bounding shape having a first major surface, a second major surface opposite the first major surface, and four edge surfaces connecting the major surfaces, the edge surfaces together forming a substantially rectangular shape. Cross-members 208 may be joined by joining member 209 for further structural integrity. The vertical support members 201, 212 and cross-member 208 can be coupled together via an adhesive or other suitable coupling means. The vertical support members 201, 212, cross-member 208, and joining member 209 can also be integrally molded as a single component during an injection molding process or machined as a single component during a machining process. At least one of the vertical support members 201, 212, e.g., vertical support member 212, is formed of a flexible material, such as a softer compound plastic than that of vertical support members 201 or cross-member 208. As such, the flexible vertical support member 212 can be bent away from the other vertical support member 201 so as to permit the insertion/removal of the HDD 104. Vertical support members 201, 212 may include feet 202 to facilitate supporting the set of drive carrier rails 101 within the multi-drive carrier 100, and retaining HDD 104 within the set of drive carrier rails 101.

Each of the vertical support members 201, 212 comprise one or more pins (or posts) 211 extending therefrom. The pins 211 facilitate the retention of the HDD 104 (or multiples thereof) within the set of drive carrier rails 101. The pins 211 can have any size and shape suitable for insertion through apertures (not shown) formed in the HDD 104 (or multiples thereof). In effect, the pins 211 removably retain the HDD 104 (or multiples thereof) to the set of drive carrier rails 101 and the multi-drive carrier 100.

Each of the vertical support members 201, 212 also may be configured to removably capture the paddle card 105. In this regard, it should be understood that each of the vertical support members 201, 212 may include a tooled or tool-less capturing member 220 extending away therefrom. Capturing member 220 may also be mounted perpendicular to vertical support members 201, 212. Alternatively, the capturing member 220 may include a brace material that is part of the vertical support members 201, 212, or a separate piece altogether. The capturing member 220 defines a channel (not shown in FIG. 2) for receiving at least a portion of the paddle card 105. Further structural details of capturing member 220 are described in copending U.S. patent application Ser. No. 12/246,170, incorporated by reference herein in its entirety.

Although not shown in FIG. 2, the set of drive carrier rails 101 can also comprise a damper mechanism (not shown), an ejection handle (not shown), a bezel (not shown), an EMI shielding gasket (not shown), and a light pipe (not shown). It should also be noted that the set of drive carrier rails 101 is absent of a planar support member. Still, the invention is not limited in this regard. For example, the flexible sidewall can also be implemented in an HDD carrier comprising a planar support member.

Paddle card 105 includes a connector 210 to electrically communicate with HDD 104. Paddle card 105 may be implemented on a substantially rigid or flexible PCB. It should be noted that embodiments of the present invention are not limited to a vertically arranged paddle card 105. For example, embodiments of the present invention can alternatively or additionally include horizontally arranged paddle card 105. Printed Circuit Boards are well known to those having ordinary skill in the art, and therefore will not be described herein. However, it should be understood that the paddle card 105 is generally configured for providing various power delivery functions, control functions, power conversion functions, and electronic conversion functions.

Figure 3:
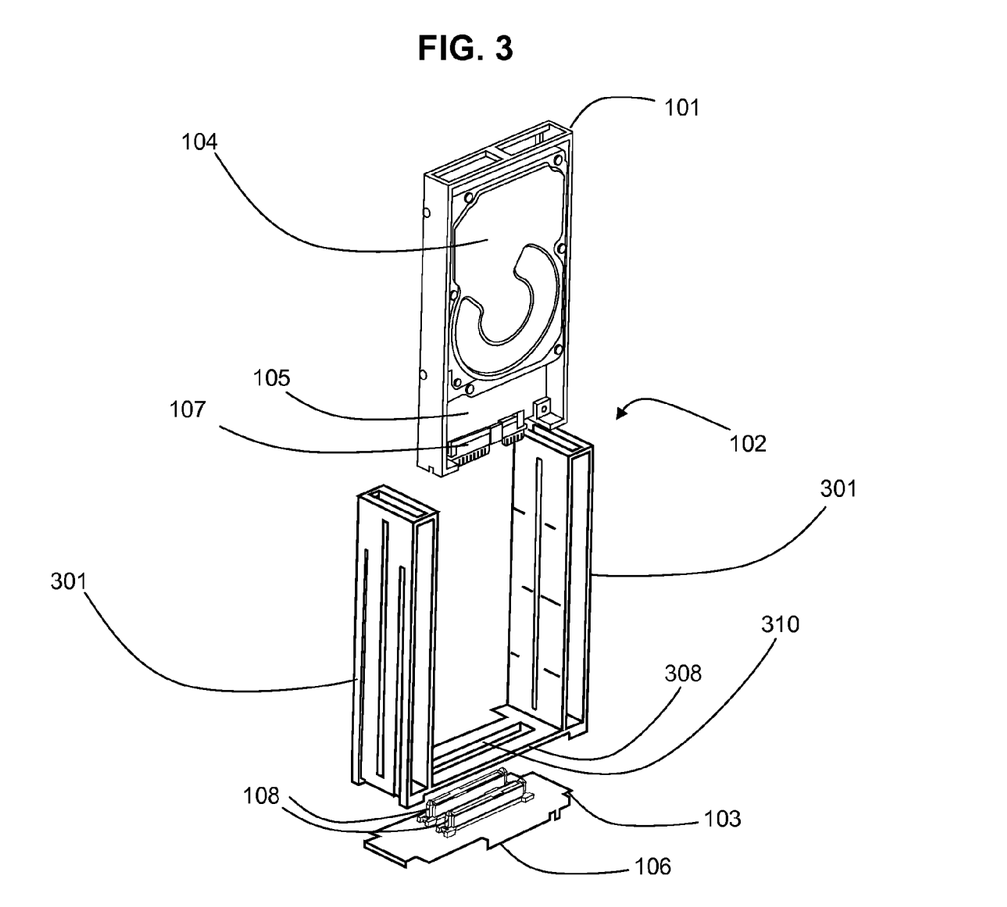
FIG. 3 is an exploded view of a portion of the exemplary multi-drive carrier assembly that is useful for understanding the present invention, showing one holder of one HDD to be inserted into the exemplary multi-drive carrier assembly, and the physical and electrical interface to a system PCB.

FIG. 3 illustrates an exploded perspective view of a portion of multi-drive carrier assembly 100, showing assembled set of drive carrier rails 101 with HDD 104 and paddle card 105 inserted therein. FIG. 3 further illustrates main carrier assembly 102, comprising two vertical support members 301 that run lengthwise along the main carrier assembly 102 to support and secure the set of drive carrier rails 101, and includes one or more cross-members 308 to provide structural integrity. Between cross-members 308 there is an opening 310. Set of drive carrier rails 101 is coupled to vertical support members 301 by use of, e.g., a set of grooves or rails and matching channels to retain the individual drive carrier rails 101 into the vertical support members 301. Other mounting mechanisms may also be used, those mechanisms including, but not limited to: a screw; rivet; captivating rail feature; friction;

tongue-in-groove design; and/or a tool-less carrier design. The set of drive carrier rails 101 may be removably coupled to vertical support members 301, such that set of drive carrier rails 101 can be removed and reinserted in order to facilitate hot-swapping HDD 104. The sets of drive carrier rails 101 are individually removable, such that the removal of one set of drive carrier rails 101, in order to hot swap the disk drive it contains, will not involve removal of a second set of drive carrier rails 101 within the same main carrier assembly 102 or disrupt operation of other disk drives within the same main carrier assembly 102.

FIG. 3 further illustrates PCB 103 unmated from paddle card 105. PCB 103 includes a connector 108 to provide electrical connectivity for each HDD 104 that the main carrier assembly 102 is capable of supporting, and connector 106 which provides electrical connectivity to a system PCB (not shown). Openings 310 are configured to allow a connector 108 to pass through when main carrier assembly 102 is assembled.

Figure 4:
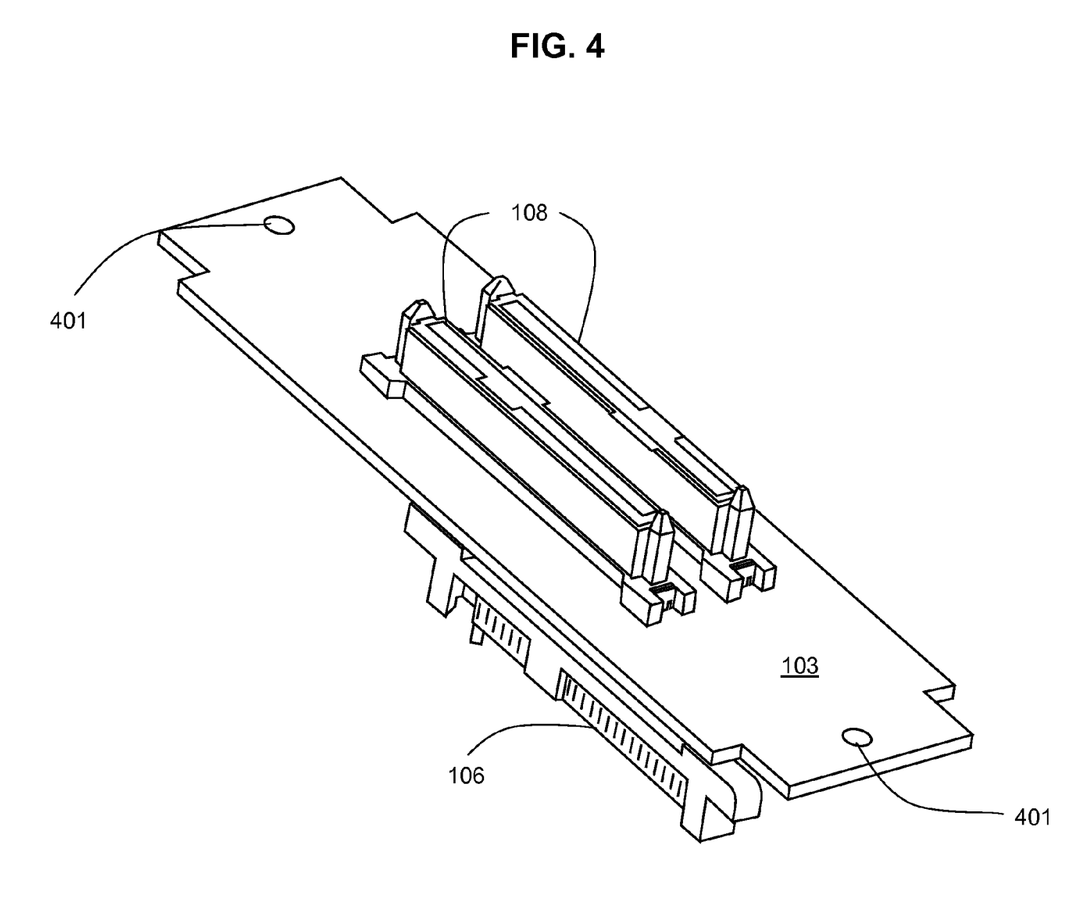
FIG. 4 is a perspective view of an exemplary PCB interface from the multiple HDD connectors to a single system baseboard connector.

FIG. 4 illustrates a detailed perspective view of PCB 103, connectors 108, connector 106, and mounting holes 401. Mounting holes 401 are used to secure PCB 103 to a system baseboard, and/or main carrier assembly 102, and/or the baseboard or midplane system board. Mounting holes 401 can be used with any type of screw, bolt, rivet, etc., known to compatible with holes similar to mounting holes 401.

Figure 5:
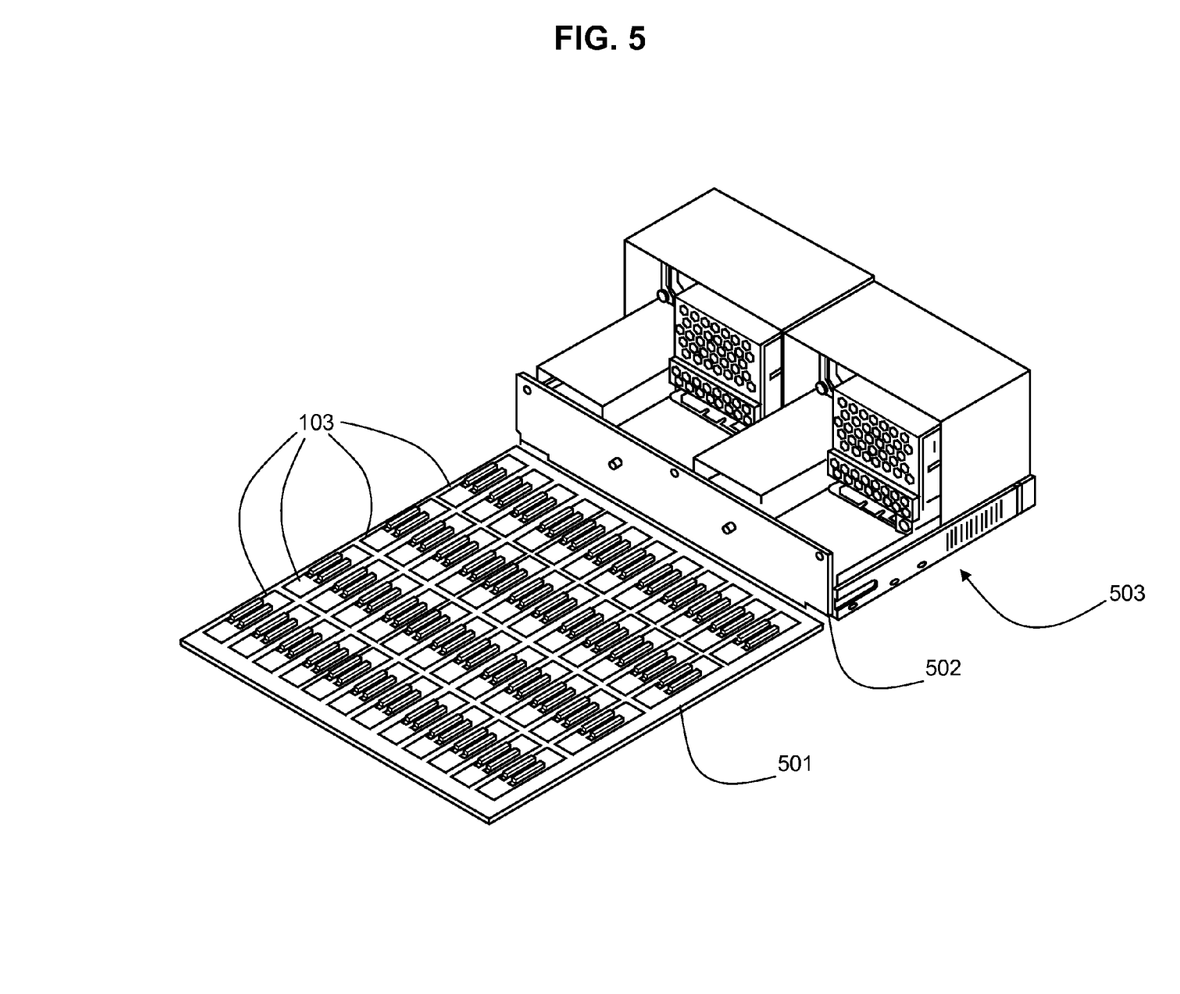
FIG. 5 is a perspective view of an exemplary system baseboard and expander module, the system baseboard having thereon a plurality of PCB interfaces.

FIG. 5 illustrates a perspective view of system baseboard 501 having mounted thereon a plurality of PCBs 103. Midplane circuit board 502 provides physical and EMI shielding from components within expander module 503. Midplane circuit board 502 may also provide additional electrical connections (not shown) for components within expander module 503, or into and/or out of expander module 503.

Figure 6:
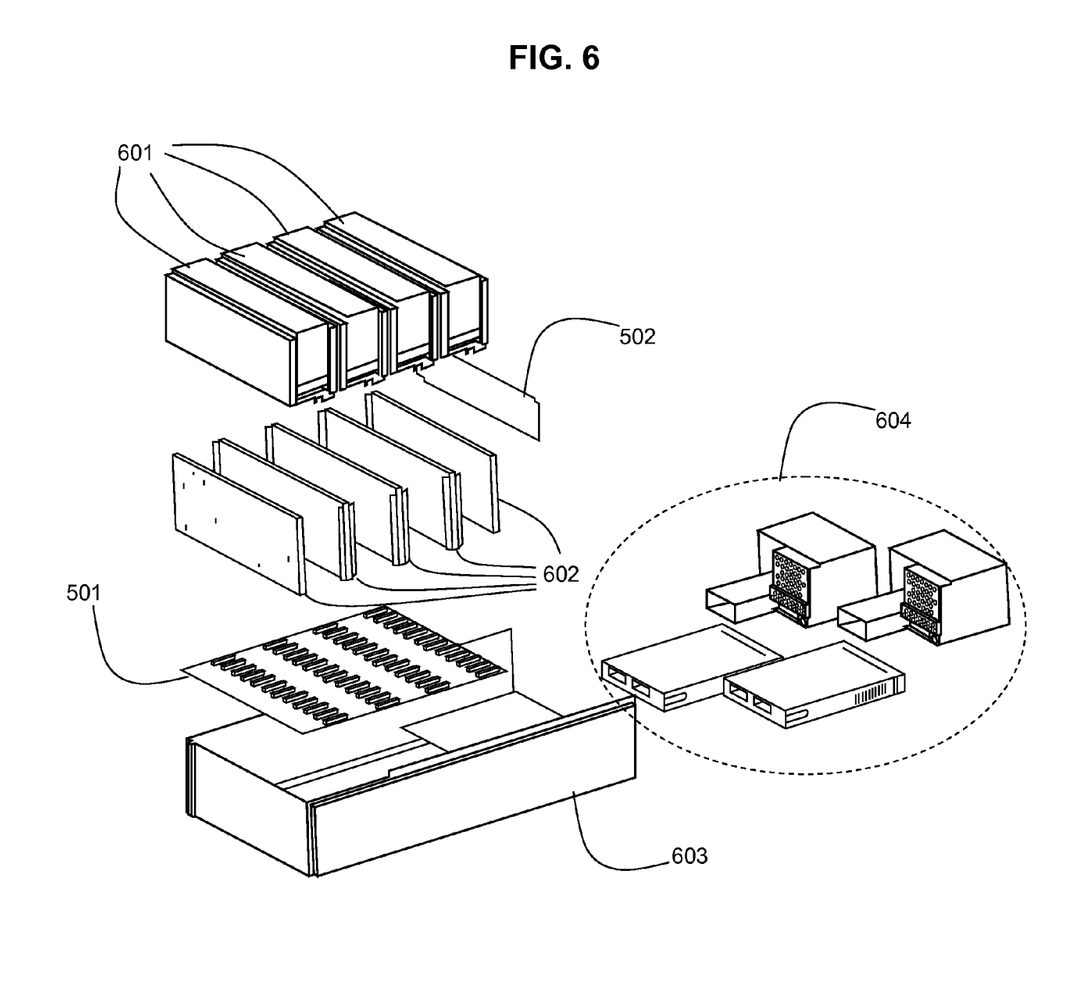
FIG. 6 is an exploded perspective view of a drive cage in accord with one or more embodiments of the invention.

FIG. 6 provides an exploded perspective view of components of a drive cage 603 in accord with one or more embodiments of the invention, including system baseboard 501, a plurality of hard drive stacks 601, a plurality of stack dividers 602, midplane circuit board 502, and components 604 of the expander module. When assembled, the plurality of stack dividers 602 are attached to system baseboard 501 by use of conventional attachment devices such as screws, bolts, rivets, adhesive, etc. Stack dividers 602 provide an attachment surface for the vertical support members 301 for each of the main carrier assemblies 102. Vertical support members 301 are coupled to stack dividers 602 by use of, e.g., a set of grooves or rails and matching channels to retain the individual vertical support members 301 into the stack dividers 602. Other mounting mechanisms may also be used, those mechanisms including, but not limited to: a screw; rivet; captivating rail feature; friction; tongue-in-groove design; and/or a tool-less carrier design. The mechanical coupling of vertical support members 301 to stack dividers 602 may be removable, such that vertical support members 301 can be removed and reinserted in order to facilitate hot-swapping of one or more of the HDD 104 held by vertical support members 301. PCB 103 also will be removable if PCB 103 is secured to main carrier assembly 102, e.g., by use of the mounting holes 401 to secure the PCB 103 to the main carrier assembly 102. Conversely, PCB 103 will not be removable if PCB 103 is secured to the system baseboard 501, e.g., by use of the mounting holes 401 to secure the PCB 103 to the system baseboard 501. Components 604 provide support circuitry and functions (voltages, cooling, command and monitoring, etc.) for the shelf 603, including HDDs, and are not described herein further.

The PCB 103 is also generally configured to cooperatively interface with an interposer, the interposer providing functions including a Serial ATA compatible multiplexer (MUX) connection. Interposer functions may be integrated with the PCB 103 to provide an integrated PCB/interposer circuit board. Serial ATA compatible MUXs are also well known to those having ordinary skill in the art, and therefore will not be described herein.

FIGS. 1-6 omit certain details with respect to the attachment of the HDDs 104a, 104b to the multi-drive carrier, or with respect to the insertion and securing of the multi-drive carrier within the chassis, or shielding or providing of visual status indicators, none of which are necessary for the understanding of embodiments of the invention. Such details may include (or not include) one or more of a bezel, an ejection handle, a damper mechanism, EMI shielding, slide rails, light pipe, pin rails, springs, attachment member, and support member.

Figure 7:
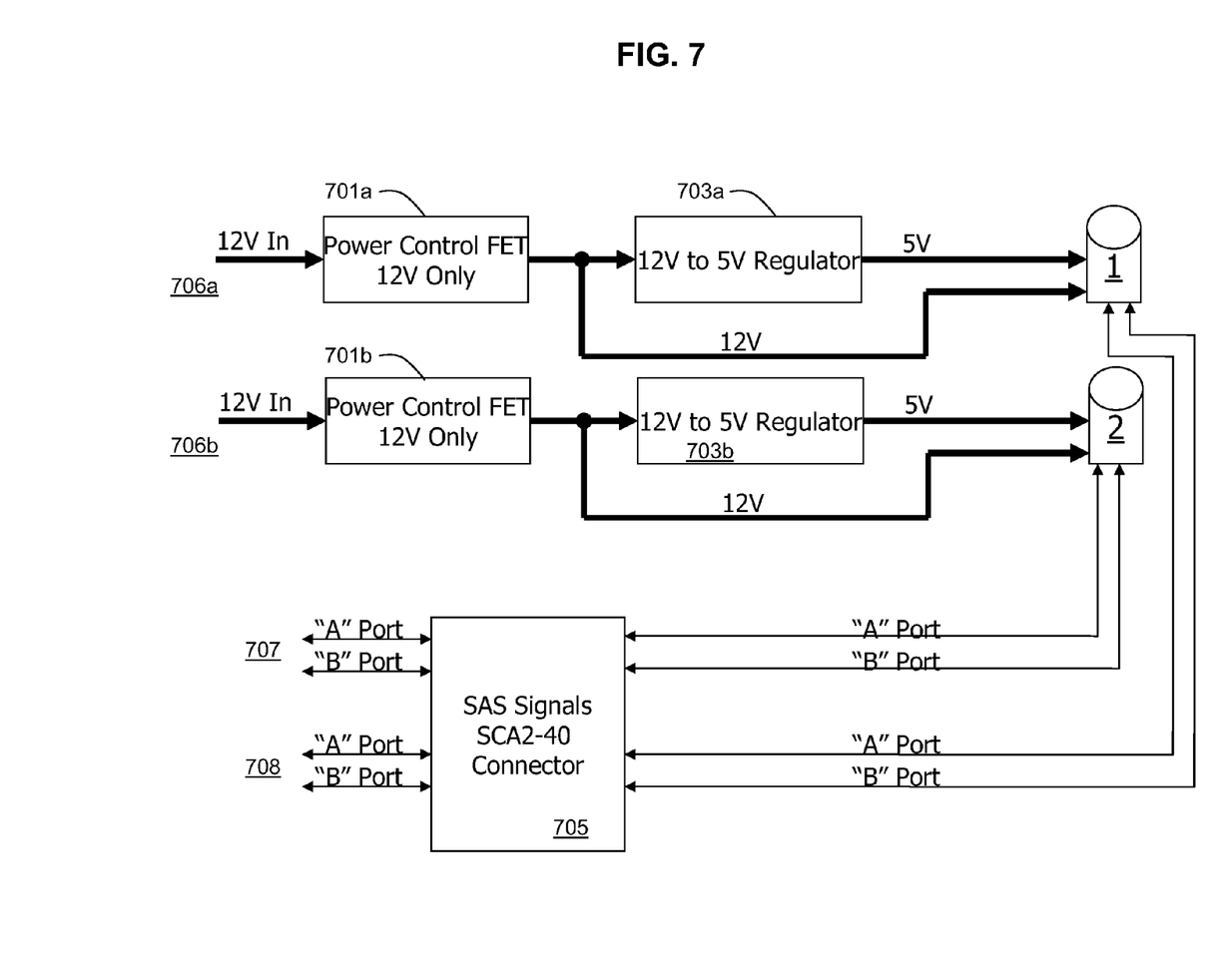
FIG. 7 is a block diagram of an SAS interposer.

Referring now to FIG. 7, there is provided an electrical block diagram of one embodiment of the function of an interposer, which may be implemented on PCB 103. The embodiment of FIG. 7 is referred to as a Serially Attached SCSI ("SAS") interposer, which is adapted to provide an interface from the disk drives using a SAS interface to a SCSI interface and vice versa, in particular a parallel SCSI interface provided via a SCA2-40 or SCA2-80 connector. In this embodiment, the interposer function provides an interface to accept dual 12 volt input power lines 706a, 706b. The 12 volt input power lines 706a, 706b may contain higher frequency components originating from, e.g., residual power supply AC voltage or transients caused by other circuitry (not shown) that is powered by the same power supply being switched on or off. The 12 volt input power is controlled and conditioned by power conditioners 701a, 701b respectively. The power conditioners 701a, 701b may be implemented as power control FETs. The power conditioners 701a, 701b provide controlled 12 volt signals having lesser undesirable frequency content. Power conditioners are known in the art and are not described herein further. The controlled 12 volt signals are provided to 12 v to 5 v regulators 703a, 703b, respectively. Regulators 703a, 703b provide a regulated 5 volt signal derived from the controlled 12 volt signals. The controlled 12 volt signals and regulated 5 volt signals are then provided to disk drives 1, 2 to power the disk drives.

PCB 103 further provides a SCA2-40 or SCA2-80 connector 705 to provide a SCSI interface for two pair of "A" port and "B" port signals 707, 708, each pair of port signals 707, 708 providing control signals to—and data read back from—one of disk drives 1, 2, respectively. For instance, the "A" port may provide commands to the respective disk drive, and the "B" port may read back data from the disk drive, or vice versa. Each pair of port signals 707, 708 is implemented at a physical level (not shown) as a +/− differential wire pair. FIG. 7 schematically shows port control signal pair 707 interfacing with disk drive 2, and port control signal pair 708 interfacing with disk drive 1. Persons skilled in the art of disk drive design will recognize that certain functions such as clocking and enabling signals used to support data transfers to and from disk drives 1, 2 are not shown in FIG. 7 for sake of simplicity.

The 12 volt inputs 706a, 706b and the power control and regulator functions 701a, 701b, 703a, 703b are duplicated for each of the drives on the multi-drive carrier. However, a single SCA2-40 or SCA2-80 connector services all of the disk drives installed in the multi-drive carrier.

Figure 8:
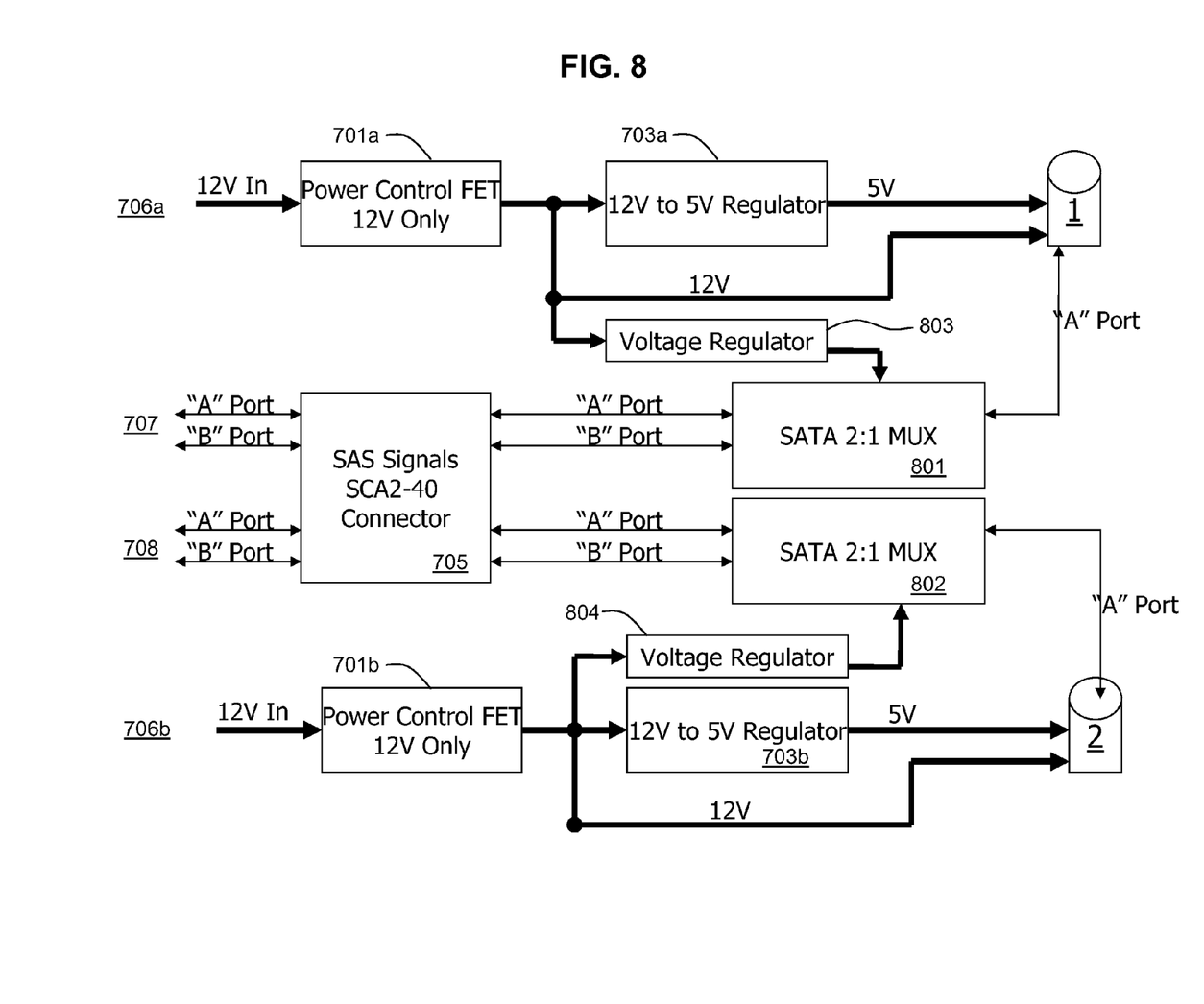
FIG. 8 is a block diagram of a SATA interposer.

Referring now to FIG. 8, there is provided an electrical block diagram of another embodiment of the interposer function. The embodiment of FIG. 8 is referred to as a Serially Attached ATA ("SATA") interposer, which is adapted to provide an interface from the disk drives using a SATA interface standard to a SCSI interface and vice versa, in particular a parallel SCSI interface provided via a SCA2-40 or SCA2-80 connector. In this embodiment, as with the embodiment of FIG. 7, the interposer function provides an interface to accept dual 12 volt input power lines 706a, 706b. The 12 volt input power lines 706a, 706b may contain higher frequency components originating from, e.g., residual power supply AC voltage or transients caused by other circuitry (not shown) that is powered by the same power supply being switched on or off. The 12 volt input power is controlled and conditioned by power conditioners 701a, 701b respectively. The power conditioners 701a, 701b may be implemented as power control FETs. The power conditioners 701a, 701b provide controlled 12 volt signals having lesser undesirable frequency content. Power conditioners are known in the art and are not described herein further. The controlled 12 volt signals are provided to 12 v to 5 v regulators 703a, 703b, respectively. Regulators 703a, 703b provide a regulated 5 volt signal derived from the controlled 12 volt signals. The controlled 12 volt signals and regulated 5 volt signals are then provided to disk drives 1, 2 to power the disk drives.

SAS design standards, commands, and protocols are known to persons of skill in the art of disk drive design. SAS includes certain design features facilitating the usage of SAS with multiple drives, including multiple SATA drives. These design features may include: multiplexing to improve bandwidth utilization, by enabling two lower rate links to share a higher rate link; zoning, which enables partitioning of a logical domain into smaller sets of accessible devices; self-discovering expander devices, to facilitate topology initialization and detection of changes; diagnostics and robustness, to improve status reporting and error notification; and affiliation support, to enable certain types of disk drives to respond to more than one host. Multi-drive carrier assembly 100 ordinarily contains drives of a single type, e.g., all SAS or all SATA, but the multi-drive carrier assembly 100 can be designed to include a mixed installation of SAS and SATA drives, upon modification of the interposer design to include support for both SAS and SATA drives simultaneously.

The embodiment of FIG. 8 further includes multiplexers 801, 802 which convert between the SATA interface used by disk drives 1, 2 to/from the SAS signals provided by the SCA2-40 or SCA2-80 connector 705. The function of multiplexers 801, 802 is to convert a single-ported SATA drive into a dual-ported SATA drive. Dual port disk drives enable a processor to perform two simultaneous data accesses, one via each of the ports of the disk drive. The multiplexers 801, 802 are intelligent and provide functions such as command interleaving, dual-porting and native command queuing support (NCQ). Voltage regulators 803, 804 provide power of a predetermined voltage to multiplexers 801, 802.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

We claim:

1. A carrier for a plurality of data storage devices, comprising:
    internal support structures sized and shaped to receive vertically and retain a data storage device;
    external support structures sized and shaped to be fittable in a memory slot of a chassis, wherein the memory slot is designed to receive a single data storage device; and
    a two-sided electrical communication interface, one side of the electrical communication interface comprising a plurality of internal connectors that removably mate with matching connectors connected to each of the plurality of data storage devices, and an opposing side of the electrical communication interface comprising a single external connector that removably mates with a matching connector on the chassis.

2. The carrier according to claim 1, wherein the single external connector is an SCA2-40 connector.

3. The carrier according to claim 1, wherein the single external connector is an SCA2-80 connector.

4. The carrier according to claim 1, wherein the single external connector is a paddle card connector.

5. The carrier according to claim 1, further comprising an interposer connecting the external connector to the plurality of internal connectors.

6. The carrier according to claim 5, wherein the interposer is implemented on a substantially rigid PCBA, and wherein the electrical communication interface comprises the substantially rigid PCBA.

7. The carrier according to claim 5, wherein the interposer provides an interface between SAS signals at the external connector to SAS signals at the plurality of data storage devices.

8. The carrier according to claim 5, wherein the interposer provides an interface between SAS signals at the external connector to SATA signals at the plurality of data storage devices.

9. The carrier according to claim 1, wherein the plurality of data storage devices within the carrier are individually hot-swappable.

10. The carrier according to claim 1, wherein the carrier is hot-swappable with another carrier, and wherein the carrier is hot-swappable with a single data storage device.

11. The carrier according to claim 1, wherein the data storage devices are removable from the first support member without use of tools.

12. The carrier according to claim 1, wherein the first support member is removable from the second support member without use of tools.

13. The carrier according to claim 11, further comprising a plurality of sidewalls formed of a flexible material.

14. The carrier according to claim 1, wherein the plurality of data storage devices comprises at most two data storage devices.

15. The carrier according to claim 14, wherein the at most two data storage devices are 2.5-inch hard disk drives, and wherein the memory slot is designed to receive a single 3.5-inch hard disk drive.

16. The carrier according to claim 1, wherein the carrier is sized to facilitate a density of ninety-six data storage devices in four rack units (4U) of chassis space.

17. The carrier according to claim 1, wherein the plurality of internal connectors are oppositely oriented with respect to the single external connector.

18. The carrier according to claim 1, wherein the single external connector is affixed along a substantially central line of a face of the external support structures, and wherein the single external connector is perpendicular to the face of the external support structures.

19. The carrier according to claim 1, wherein the single external connector is a midplane connector.

20. The carrier according to claim 1, wherein the single external connector is positioned vertically with respect to the vertically-retained data storage devices.

21. A carrier for a plurality of data storage devices, comprising:
- a first support member sized and shaped to receive vertically and retain a data storage device;
- a second support member sized and shaped to receive and retain a plurality of first support members, the second support member removably fittable in a chassis; and
- an electrical communication interface from the chassis to the data storage devices within the plurality of first support members, the electrical communication interface comprising:
  (i) a single external connector that removably mates with a matching connector on the chassis, wherein the single external connector is a Single Connector Attachment (SCA) connector;
  (ii) a plurality of internal connectors removably mating with the data storage devices, wherein the plurality of internal connectors point in an opposite geometric direction as the single external connector; and
  (iii) an interposer communicatively connecting all the data storage devices within the plurality of first support members to the single external connector.

22. A carrier for a plurality of data storage devices, comprising:
- a first support member sized and shaped to receive vertically and retain a data storage device;
- a second support member internally sized and shaped to receive and retain a plurality of first support members, wherein the second support member is externally sized and shaped such that the carrier has an external form factor that is substantially equivalent to an external form factor of a single data storage device with a disk diameter of 2.5 to 3.5 inches; and
- an electrical communication interface from the chassis to the data storage devices within the plurality of first support members, the electrical communication interface comprising a single external connector that removably mates with a matching connector on the chassis.

* * * * *